US009727243B2

(12) United States Patent
Hatfield et al.

(10) Patent No.: US 9,727,243 B2
(45) Date of Patent: Aug. 8, 2017

(54) USING INACTIVE COPY RELATIONSHIPS TO RESYNCHRONIZE DATA BETWEEN STORAGES

(71) Applicant: INTERNATIONAL BUSINESS MACHINES CORPORATION, Armonk, NY (US)

(72) Inventors: Brian D. Hatfield, Tucson, AZ (US); Bradley J. Smith, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 21 days.

(21) Appl. No.: 14/788,539

(22) Filed: Jun. 30, 2015

(65) Prior Publication Data

US 2017/0003883 A1    Jan. 5, 2017

(51) Int. Cl.
*G06F 12/00*    (2006.01)
*G06F 3/06*    (2006.01)

(52) U.S. Cl.
CPC ............ *G06F 3/0604* (2013.01); *G06F 3/065* (2013.01); *G06F 3/0619* (2013.01); *G06F 3/0635* (2013.01); *G06F 3/0683* (2013.01)

(58) Field of Classification Search
CPC ....... G06F 3/065; G06F 3/0683; G06F 3/0619
USPC ......................... 711/162, 156, 114
See application file for complete search history.

(56) References Cited

U.S. PATENT DOCUMENTS

| 6,035,412 | A | 3/2000 | Tamer et al. |
| 6,578,120 | B1 | 6/2003 | Crockett et al. |
| 7,461,226 | B2 | 12/2008 | Iwamura et al. |
| 7,603,581 | B2 * | 10/2009 | Boyd ................. G06F 11/2058 714/13 |
| 7,716,518 | B2 | 5/2010 | Butterworth et al. |
| 7,788,225 | B2 | 8/2010 | Fish et al. |
| 7,895,162 | B2 | 2/2011 | Tanaka et al. |
| 7,979,897 | B2 | 7/2011 | Klein et al. |
| 8,020,037 | B1 * | 9/2011 | Schwartz ............ G06F 11/2094 714/41 |

(Continued)

FOREIGN PATENT DOCUMENTS

GB    2494950 B  *  8/2013  ........... G06F 3/0608

OTHER PUBLICATIONS

U.S. Appl. No. 15/094,051, filed Apr. 8, 2016, 18.629.

(Continued)

*Primary Examiner* — Pierre-Michel Bataille
(74) *Attorney, Agent, or Firm* — David W. Victor; Konrad Raynes Davda & Victor LLP

(57) ABSTRACT

Provided are computer program product, system, and method for using inactive copy relationships to resynchronize data among n storages referenced as storages 1 through n, wherein n is greater than or equal to three. n−1 active copy relationships are established. Each active copy relationship copies data from one of the storages 1 through n−1 as a source storage to one other of the storages 2 through n as a target storage respectively. At least one inactive copy relationship is established to copy data from one of the storages 1 through n−1 as the source storage to one other of the storages 2 through n as a target storage, such that the source and target storages in the inactive copy relationship are not both also in a same of at least one of the active copy relationships.

24 Claims, 7 Drawing Sheets

(56) References Cited

U.S. PATENT DOCUMENTS

| | | | |
|---|---|---|---|
| 8,161,256 | B2 | 4/2012 | Hara et al. |
| 8,667,033 | B1 | 3/2014 | McCline et al. |
| 9,092,449 | B2* | 7/2015 | Brown .................. G06F 3/0619 |
| 9,495,409 | B1* | 11/2016 | Revur ................ G06F 17/30371 |
| 9,514,013 | B2* | 12/2016 | Hatfield .............. G06F 11/2058 |
| 2005/0050288 | A1 | 3/2005 | Takahashi et al. |
| 2006/0143497 | A1 | 6/2006 | Zohar et al. |
| 2007/0050547 | A1 | 3/2007 | Sano et al. |
| 2007/0198790 | A1* | 8/2007 | Asano ................... G06F 3/0605 711/162 |
| 2008/0022058 | A1 | 1/2008 | Nadathur et al. |
| 2014/0108345 | A1 | 4/2014 | Brown et al. |
| 2014/0156595 | A1 | 6/2014 | Rose et al. |

OTHER PUBLICATIONS

List of IBM Patents or Patent Applications Treated as Related dated Apr. 12, 2016, pp. 2.

Y.C. Lien, et al., "Method for Creating Consistent Bitmaps", IBM Corporation, IP.com, Jul. 1, 1990, TDB n2, 07-90, p. 417-421, IP.com No. IPCOM000101300D, electronic publication Mar. 16, 2005.

U.S. Appl. No. 14/318,395, filed Jun. 27, 2014.

U.S. Appl. No. 14/788,379, filed Jun. 30, 2015.

D. Clitherow, "GDPS Family An Introduction to Concepts and Capabilities", IBM Corporation, Document SG24-6374-09, Aug. 2014, pp. 324.

"Recovery Scenario using Incremental Resynchronization in a Metro/Global Mirror Configuration", IBM Corporation, [online] [retrieved Apr. 25, 2015] http://www-01.ibm.com/support/knowledgecenter/api/content/nl/en-us/ . . . , pp. 12.

"Recovery Scenarios for Metro/Global Mirror with Incremental Resync", IBM Corporation, [online] [retrieved Apr. 25, 2015] http://www-01.ibm.com/support/knowledgecenter/api/content/nl/en-us/ . . . , pp. 3.

List of Patents or Patent Applications That Are Related, dated Jun. 30, 2015, pp. 2.

Office Action dated Mar. 24, 2016, pp. 17, for U.S. Appl. No. 14/318,395, filed Jun. 27, 2014.

Response dated Jun. 24, 2016, pp. 15, to Office Action dated Mar. 24, 2016, pp. 17, for U.S. Appl. No. 14/318,395, filed Jun. 27, 2014.

Notice of Allowance dated Aug. 12, 2016, pp. 11, for U.S. Appl. No. 14/318,395, filed Jun. 27, 2014.

\* cited by examiner

Active Copy Relationship

Inactive Copy Relationship

USING INACTIVE COPY RELATIONSHIPS TO RESYNCHRONIZE DATA BETWEEN STORAGES

BACKGROUND OF THE INVENTION

1. Field of the Invention

The present invention relates to a computer program product, system, and method for using inactive copy relationships to resynchronize data between storages.

2. Description of the Related Art

In a storage environment, a storage controller may maintain mirror copy relationships, where a source volume in a mirror copy relationship comprises the storage or volumes from which data is physically copied to a target volume. Failover programs, such as International Business Machines Corporation's ("IBM") HyperSwap® which is a function in the z/OS® operating system, provides continuous availability for disk failures by maintaining the mirror copy relationships to provide synchronous copies of source (primary) disk volumes in one or more storage systems to one or more target (secondary) volumes in one or more storage systems. (HyperSwap is a registered trademark of IBM in countries throughout the world). When a disk failure is detected, code in the operating system identifies HyperSwap managed volumes and instead of failing the I/O request, HyperSwap switches (or swaps) information in internal control blocks so that the I/O request is driven against the target volume of the mirror copy relationship. Since the target volume is an identical copy of the source volume prior to the failure, the I/O request will succeed with no impact to the program issuing the I/O request, which could be an application program or part of the operating system. This therefore masks the disk failure from the program and avoids an application and/or system outage.

A mirror copy relationship may maintain a current and previous bitmaps to keep track of updates at the source volume that need to be copied or synchronized to the target storage. A previous bitmap, also known as an out-of-synch bitmap, indicates updated data in the source volume that occurred in a previous interval, or consistency period, and a current bitmap, also known as a change recording bitmap, which indicates updated data in the source volume that occurred in the current interval or current consistency period. After the replication manager copies all updated data indicated in the previous bitmap, the bitmaps would be toggled to create a new interval, so that the previous bitmap is set to the current bitmap to copy all updated data prior to the new interval, and a new current bitmap would be initialized to record writes in the new interval. In this way, updates that occur while data is being synchronized get recorded without interfering with the synchronization of the writes as of the recent interval.

Further, current mirror copy environments allow for the incremental resynchronization between a first and third site in a three site cascaded configuration (e.g., a first storage synchronizes a source volume to a second storage and then the second storage synchronizes to a further third storage in the cascaded configuration). If there is a failure at the second storage, then the source server may perform resynchronization between the first storage and the third storage, so that the final third storage in the cascade is the new target of the synchronization from the first storage. In order to perform the resynchronization, a pair of change recording bitmaps for the synchronization from the first storage to the third storage is used to track the synchronization of the source data from the second storage to the final third storage. These change recording bitmaps are used during resynchronization, also known as an incremental resynchronization recovery operation, to determine data in the third storage that needs to be resynchronized from the source storage.

SUMMARY

Provided are computer program product, system, and method for using inactive copy relationships to resynchronize data among n storages referenced as storages 1 through n, wherein n is greater than or equal to three. An n−1 active copy relationships are established, wherein each active copy relationship copies data from one of the storages 1 through n−1 as a source storage to one other of the storages 2 through n as a target storage respectively, wherein each active copy relationship includes synchronization information indicating data to copy from the source storage to the target storage of the active copy relationship. At least one inactive copy relationship is established to copy data from one of the storages 1 through n−1 as the source storage to one other of the storages 2 through n as a target storage, such that the source and target storages in the inactive copy relationship are not both also in a same of at least one of the active copy relationships, wherein each of the inactive copy relationships includes synchronization information indicating data to copy from the source storage to the target storage of the inactive copy relationship, wherein data is not synchronized from the source storage to the target storage of the inactive copy relationship.

DETAILED DESCRIPTION

Replication environments provide for incremental resynchronization between different sites in a three site cascaded configuration (A→B→C) by use of change recording bitmaps. However, there is a need in the art to provide for resynchronization in a cascaded configuration having more than three sites, i.e., more than three storages, in the cascade to allow for resynchronization if any of multiple storages fail.

Described embodiments provide techniques to allow for a resynchronization of any of a plurality of storages in the event of a failure detected at a source storage that was copying data to another storage storage by maintaining inactive copy relationships from a source storage to a storage in the cascade to which the data in the source storage is indirectly copied, which excludes the target storage in the active copy relationship having the source storage. The inactive copy relationships track updates to a source storage so that in the event of a failure at another source storage copying data to the target of the inactive copy relationship, the inactive copy relationship may be activated to copy data from the source storage of the inactive copy relationship to the target that is no longer synchronized from the failed storage.

Described embodiments allow for multiple inactive copy relationships to a same target storage that may be selected to resynchronize from any source storage of the inactive copy relationship because the inactive copy relationship tracks updates to a target storage to be updated from a source storage that does not comprise the failed source storage in the inactive copy relationship.

Figure 1:
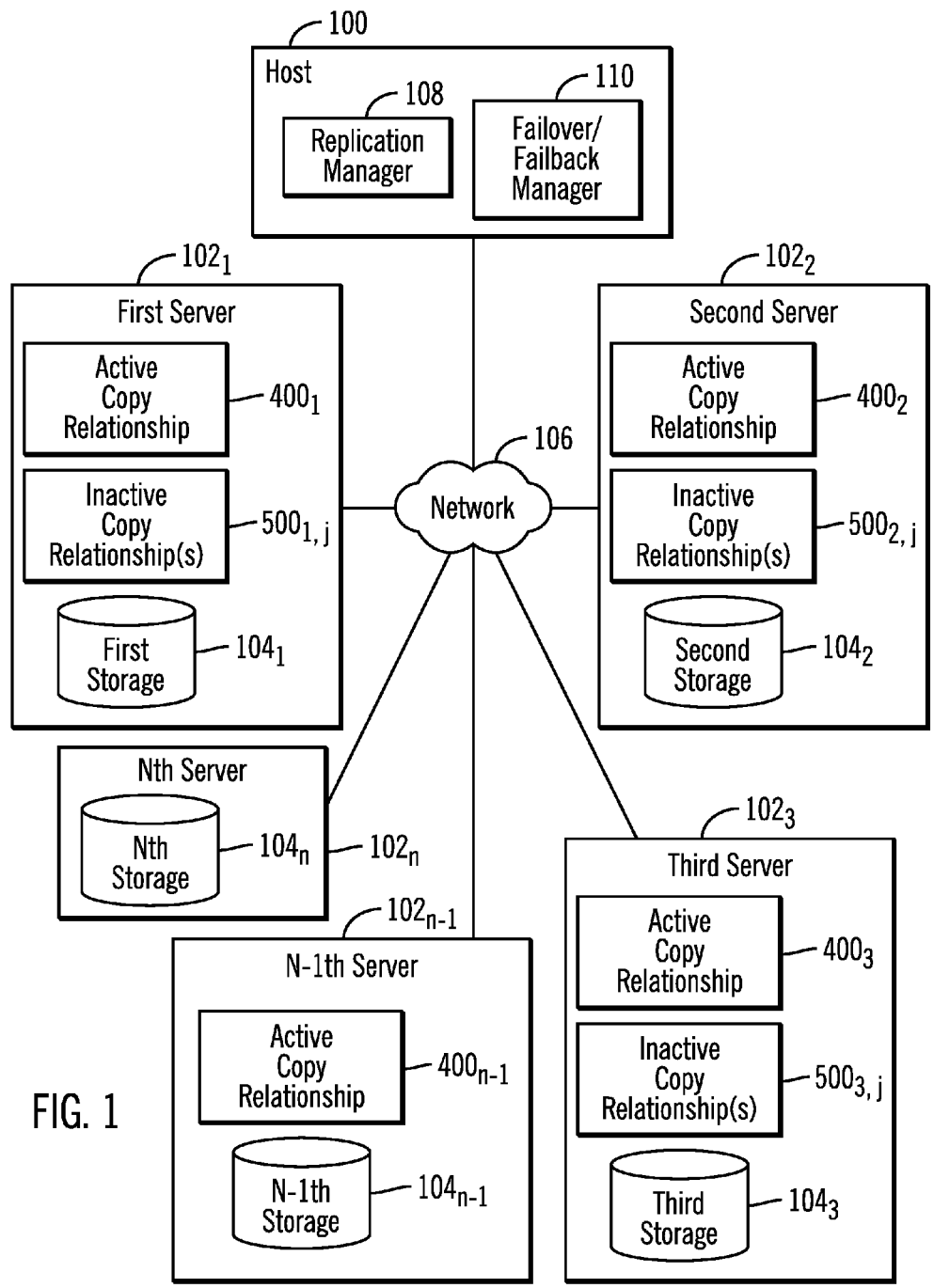
FIG. 1 illustrates an embodiment of a storage replication environment.

FIG. 1 illustrates an embodiment of a replication copy storage environment having a host system 100 that is connected to a plurality of storage servers $102_1$, $102_2$, $102_3$ ... $102_n$. Each server $102_1$, $102_2$, $102_3$ ... $102_n$ manages a corresponding storage $104_2$, $104_3$ ... $104_n$, respectively, over a network 106. In one embodiment, data in the first storage $104_1$ is copied to second through nth storages $104_2$, $104_3$ ... $104_n$ in different servers $102_2$, $102_3$ ... $102_n$ as part of a series of cascading active copy relationships $400_1$ ... $400_{n-1}$, where there is an active copy relationship $400_i$ to copy updates to source storage i whose updates are copied to the (i+1) storage, for i=1 to n−1, in the cascade configuration.

The servers $102_1$, $102_2$ ... $102_{n-2}$ may further include one or more inactive copy relationships $500_{i,j}$, in which i is the source storage $104_i$ and j is the target storage $104_j$. Inactive copy relationships $500_{i,j}$ track updates to source storage $104_i$ that is also a source storage in another active copy relationships 400i whose data is copied to the target storage $104_j$ through intermediate active copy relationships. Thus, the inactive copy relationship $500_{i,j}$ indicates updates to the source storage $104_i$ to be copied to the target storage $104_j$ via another active copy relationship.

In an alternative embodiment, the storages $104_2$, $104_3$ ... $104_n$ may all be in one storage server. Still further, there may be two or more storages to which the data from another storage is copied. The data subject to the copying from the first storage $104_1$ to the second through nth storages $104_2$, $104_3$ ... $104_n$ may comprise a volume or other logical unit. The host 100 and storage servers $102_1$, $102_2$, $102_3$ ... $102_n$ may communicate over the network 106. There may be additional hosts (not shown) that provide Input/Output (I/O) requests to the storages $104_1$, $104_3$ ... $104_n$.

In described embodiments, storages are described as a first storage, second storage, third storage ..., n−1th storage and nth storage, which indicates a storage order in which updates are cascaded from a first storage to a second storage to a third storage and serially all the way to the nth storage. The first storage $104_1$ may comprise a primary product volume to which data is copied to the other storages $104_2$ ... $104_n$.

The host system 100 includes a replication manager 114 to establish copy relationships 400, 500 between the different storages as shown by the active copy relationships $400_1$, $400_2$, $400_3$ ... $400_{n-1}$ and inactive copy relationships $500_{1,j}$, $500_{2,j}$, $500_{3,j}$ ... $500_{n-2}$. The active copy relationships $400_1$ are defined to synchronize/copy data from a source storage to a target storage, where for an active copy relationship $400_i$ data is synchronized from the source storage $104_i$ to a target storage $104_{i+1}$ for i=1 to n−1. An active copy relationship $400_2$, $400_3$ ... $400_{n-1}$ synchronizes data from the source storage to a target storage. An inactive copy relationship $500_1$, $500_2$, $500_3$ ... $500_{n-2}$ does not actively synchronize data, but indicates the source data of the inactive copy relationship relationship to be synchronized to the target storage when the source storage of the inactive copy relationship is updated. In this way, when an inactive copy relationship is later activated, all the data indicated as updated or needing to be synchronized in the inactive copy relationship may be synchronized from the source to the target identified in the inactive copy relationship.

The host 100 further includes a failover/failback manager 110 to use to implement a failover and failback for a source and target storage of a copy relationship. A failover from a first volume to a second volume removes the first volume from the active copy relationship in which the first volume is a target volume. Further, a failback from the source volume to a target volume, removes that failback target volume as a source volume in another copy relationship in which the failback source volume is the target volume, but the failback target volume could be a source volume in copy relationships to target volumes other than the failback source volume.

Figure 2:
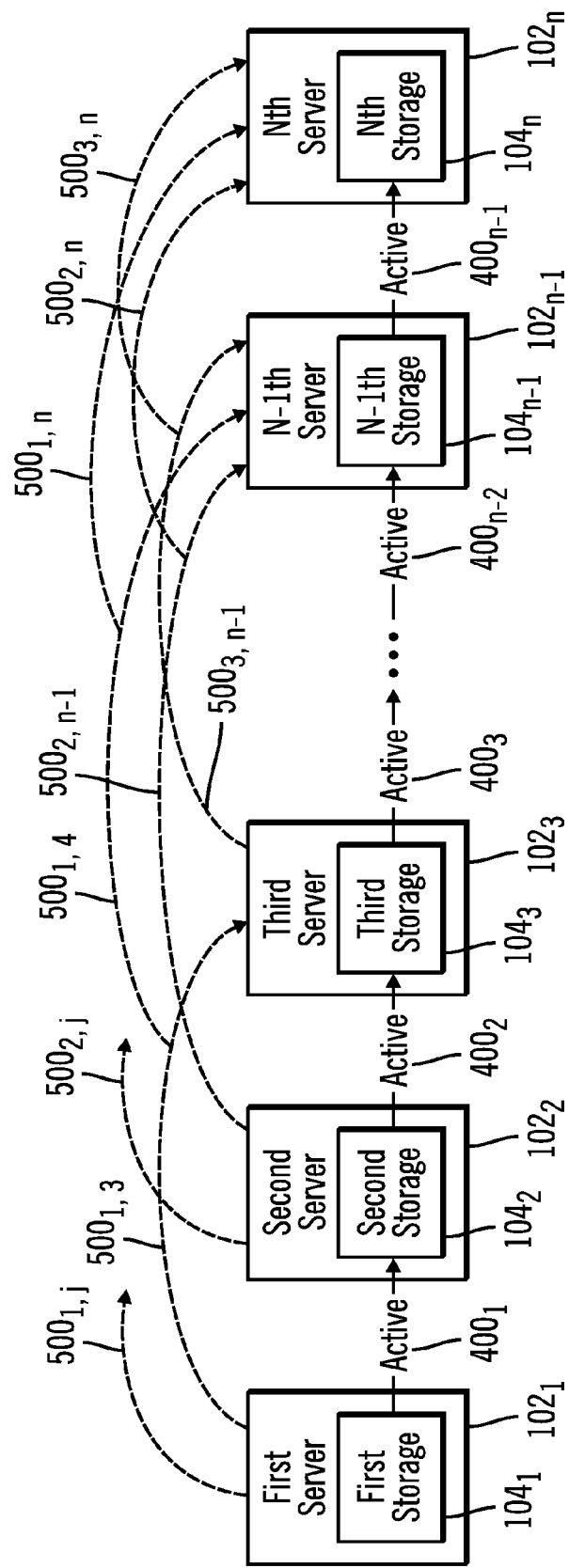
FIG. 2 illustrates an embodiment of a cascaded configuration in the storage replication environment.

FIG. 2 illustrates an embodiment of a cascaded copy architecture where active copy relationships $400_1$, $400_2$, $400_3$ ... $400_{n-1}$ specify to copy data serially from the first through (n−1)th storages $104_1$ ... $104_{n-1}$ to the second through nth storages $104_2$ ... $104_n$, respectively. Further, the inactive copy relationships $500_{i,j}$ are shown with dashed lines, such that each storage 104i whose data is indirectly copied to another storage, excluding the storage to which the data is directly copied as a result of the active copy relationship $104_i$ may have inactive copy relationships $500_{i,j}$ from the source storage $104_i$ to target storages $104_j$ not in the active copy relationship $500_{i,i+1}$. For instance, the first server $104_1$ may have inactive copy relationships $500_{1,3}$ ... $500_{2,n-1}$, $500_{2,n}$, where inactive copy relationship $500_{i,j}$ specifies a source storage i to copy to a target storage j. The second server $104_2$ may have inactive copy relationships $500_{2,4}$ ... $500_{2,n-1}$, $500_{2,n}$ and the third server $104_3$ may have inactive copy relationships $500_{3,5}$ ... $500_{3,n-1}$, $500_{2,n}$. As discussed, if the source storage in an active copy relationship fails, the inactive copy relationship may be activated to allow resynchronization to the target storage whose source failed. There are no inactive copy relationships for the n−1th and nth storages because there are no storages to which data from the storages $104_{n-1}$ and $104_n$ are indirectly copied outside of active copy relationships.

In certain embodiments, the total number of inactive copy relationships for any source storage $104_i$ whose data is actively copied to storage $104_{i+1}$ and indirectly copied to storages $104_{i+2}$ ... $104_n$, is n−(i+1) inactive copy relationships, where n is the total number of storages to which the data is copied. In this case, the total number of inactive copy relationships that may be created in the system is expressed by the equation (1) below:

$$\sum_{i=1}^{n-2} n-(i+1) \qquad (1)$$

In alternative embodiments, data may be synchronized from an initial source to the storages in configurations other than a cascading configuration, which may result in a different number of possible inactive copy relationships, such that a source storage may be in as many inactive copy relationships as there are other storages to which the data from the source storage is indirectly copied following the active copy relationship of the source storage.

Figure 3:
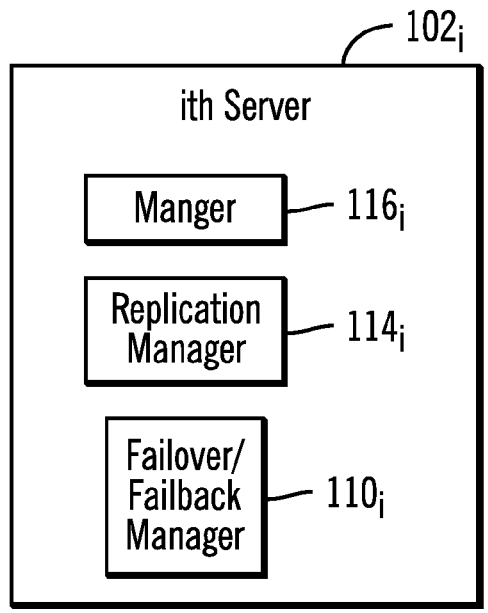
FIG. 3 illustrates an embodiment of a server in the storage replication environment.

FIG. 3 shows an embodiment of a server $102_n$ comprising one of the servers $102_1$, $102_2$, $102_3$ ... $102_n$, as including an Input/Output (I/O) manager 116, to manage I/O requests directed to the storage managed by the server $102_i$, a replication manager $114_i$ to replicate data to another target, and a failback/failover manager $110_i$ to manage failover and failback operations. The server failover/failback manager $110_i$ and replication manager $114_i$ may coordinate replication and failover/failback operations with the host 100. Further operations described as performed by any of the server failover/failback manager 110, $110_i$ may be performed by other components, including other failover/failback managers than those described. The failover/failback manager $110_i$ also establishes and terminates relationships as part of the failback and failover operations.

In one embodiment, the active copy relationships 400 are created by the replication manager 108 in the host 100 and the inactive copy relationships 500 are created by the replication manager $108_i$ on the storage server $102_i$. The servers $102_1$ ... $102_n$ may comprise an enterprise storage controller/server suitable for managing access to attached storage devices, such as, but not limited to, the International Business Machines Corporation's ("IBM") DS8000® storage system or other vendor storage servers known in the art. (DS8000 is a registered trademark of IBM in countries throughout the world).

In one embodiment, the replication manager 114, $114_i$ comprises a program for managing the mirroring of volumes across systems, such as, but not limited to, the IBM mirroring programs Geographically Dispersed Parallel Sysplex® (GDPS)®, and Tivoli® Storage Productivity Center for Replication (TPC-R) that define a replication session and copy pairs 400. Different types of techniques may be selected to copy the data, such as synchronous mirroring, asynchronous mirroring or point-in-time copying, or combinations of multiple of these different mirroring types. The failover/failback manager 110, $110_i$ may comprise a program suitable for handling failover and failback operations, such as, but not limited to, the IBM HyperSwap product which establishes failover sessions from the established copy pairs. (Geographically Dispersed Parallel Sysplex, GDPS, Tivoli, and HyperSwap are registered trademarks of IBM in countries throughout the world).

The network 106 may comprise a Storage Area Network (SAN), Local Area Network (LAN), Intranet, the Internet, Wide Area Network (WAN), peer-to-peer network, wireless network, arbitrated loop network, etc. The storages $104_1$, $104_2$, $104_3$ ... $104_n$ may each be implemented in one or more storage devices, or an array of storage devices configured as Just a Bunch of Disks (JBOD), Direct Access Storage Device (DASD), Redundant Array of Independent Disks (RAID) array, virtualization device, tape storage, flash memory, etc. The storage devices may comprise hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Although a certain number of instances of elements, such as servers, storages, active and inactive copy relationships, etc., are shown, there may be any number of these components.

Figure 4:
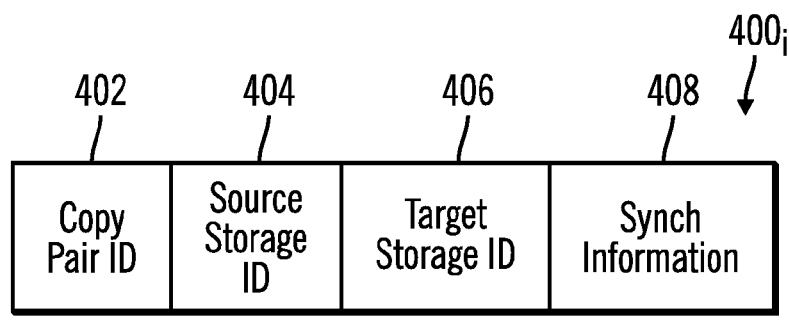
FIG. 4 illustrates an embodiment of an active copy relationship.

FIG. 4 illustrates an embodiment of an instance of an active copy relationship $400_i$, e.g., active copy relationships $400_1$, $400_2$ ... $400_{n-1}$, for which data is actively and currently being synchronized as including a copy pair identifier (ID) 402; a source storage identifier (ID) 404, e.g., as a volume or other logic unit identifier, from which data is synchronized/copied; a target storage ID 406, e.g., a volume or other logic unit identifier, to which data is synchronized; and synchronization information 408 indicating data units or tracks in the source storage 404 that need to copied or synchronized to the target storage 406.

Figure 5:
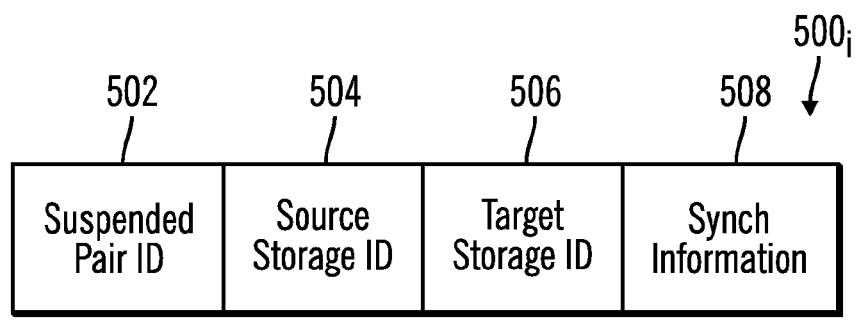
FIG. 5 illustrates an embodiment of an inactive copy relationship.

FIG. 5 illustrates an embodiment of a suspended or inactive copy relationship $500_{i,j}$ as including a suspended pair ID 502 identifying the inactive copy relationship; a source storage ID 504 identifying the source storage $104_i$ from which data will be synchronized when the inactive copy relationship is activated; a target storage ID 506 identifying the target storage $104_j$ to which the source data 504 is copied; and synchronization information 508 indicating data units that need to be copied from the source storage 504 to the target storage 506. The synchronization information 508 may comprise two bitmaps that are toggled as described below.

The synchronization information 408, 508 may comprise bitmaps having array of cells, where each cell indicates one of the data units subject to the copy relationship. In alternative embodiments, the bitmaps may comprise other types of data structures other than arrays used to indicate data units of the copy relationship that have been updated and that need to by synchronized to the target. To toggle bitmaps for the inactive copy relationships, two bitmaps are provided, a previous bitmap for the inactive copy relationship indicates data units that need to be copied from the source storage to the second storage as a result of write operations to the source storage during a previous interval, i.e., previous point-in-time. A current bitmap indicates data units that need to be copied from the source storage to the target storage as a result of write operations to the source storage during a current interval following the previous interval. The toggling may be triggered when all updates from the previous interval indicated in the previous bitmap have been copied from the source storage to the target storage.

To perform the toggling, the previous bitmap for the inactive copy relationship $500_j$ is discarded. A previous pointer for the previous bitmap is then set to point to the current bitmap for the inactive copy relationship $500_{i,j}$ and a current pointer for the current bitmap is set to point to a new bitmap initialized to indicate nothing to copy, e.g., all zeroes, is allocated. Updates to the source storage following the toggling are then indicated in the new bitmap addressed by the current pointer. In this way, the bitmaps are toggled by adjusting the pointer for the previous bitmap to point to the data structure of the current bitmap, and the pointer for the current bitmap would be adjusted to point to a new empty bitmap.

In one embodiment, the replication manager 108 may toggle the bitmaps of each inactive copy relationship $500_{i,j}$ by sending a message to all the replication managers $114_i$ on other storage servers $102_2$, $102_3$ ... $102_n$ to have them toggle any inactive copy relationship bitmaps they manage having a source storage that comprises the target storage of the active copy relationship $500_{i,j}$ whose updates from the previous bitmap, i.e., previous interval, have been synchronized.

Figure 6:
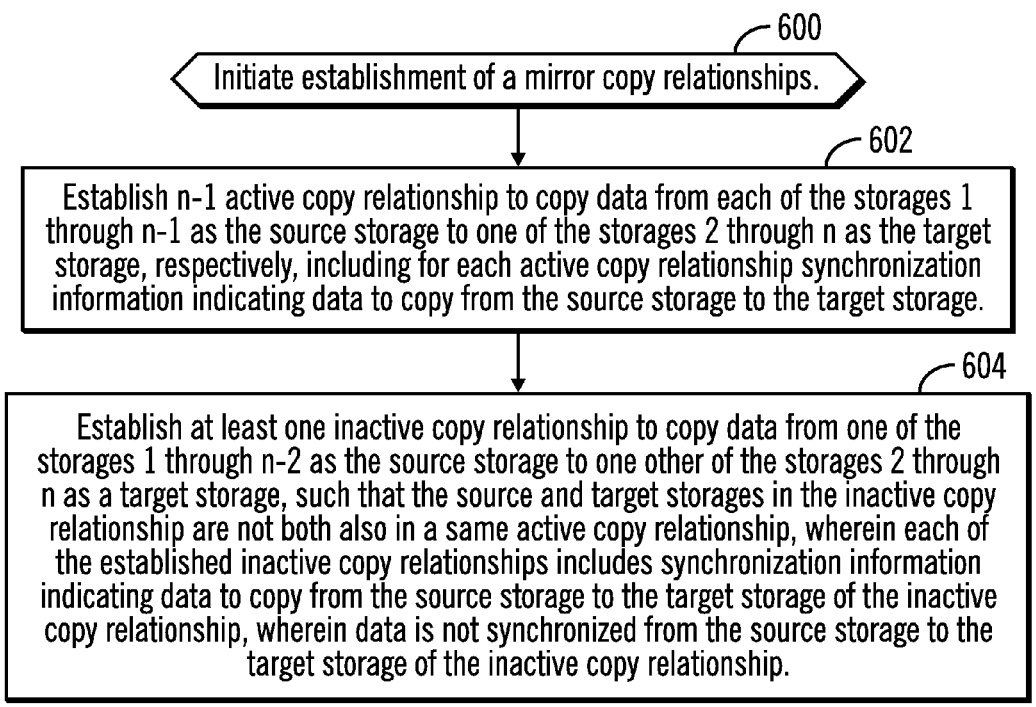
FIG. 6 illustrates an embodiment of operations to establish mirror copy relationships.

FIG. 6 illustrates an embodiment of operations performed by the replication manager 114, $114_i$ to establish the active copy relationships $400_1 \ldots 400_{n-1}$ to implement the cascaded synchronizing operations and the inactive copy relationships $500_1$. These operations of FIG. 6 may each be initiated in response to user entered establish commands via a user interface of the replication manager 114, $114_i$ or automatically executed as part of a script program including the mirror copy relationship establish commands. Upon initiating (at block 600) the operations to establish a mirror copy relationships $400_i$, the replication manager 114, $114_i$ establishes (at block 602) n-1 active copy relationships $400_1 \ldots 400_{n-1}$ to copy data from each of the storages $104_1$ through $104_{n-1}$ as the source storage to one of the storages $104_2$ through $104_n$ as the target storage, respectively. For each created active copy relationship $400_1 \ldots 400_{n-1}$, including synchronization information 408 indicating data to copy from the source storage to the target storage, including updates that need to be synchronized.

The replication manager 114, $114_i$ may further establish (at block 604) at least one inactive copy relationship $500_{i,j}$ to copy data from one of the storages $104_1$ through $104_{n-2}$ as the source storage i to one other of the storages $104_2$ through $104_n$ as a target storage j, such that the source $104_i$ and target storages $104_j$ in the inactive copy relationship $500_{i,j}$ are not both also in a same active copy relationship. Each of the established inactive copy relationships $500_{i,j}$ includes synchronization information indicating data to copy from the source storage $104_i$ to the target storage $104_j$ of the inactive copy relationship. After the inactive copy relationship $500_{i,j}$ is established, data is not synchronized from the source storage $104_i$ to the target storage $104_j$ of the inactive copy relationship, but the synchronization information is updated to indicate data that still needs to be synchronized.

Figure 7:
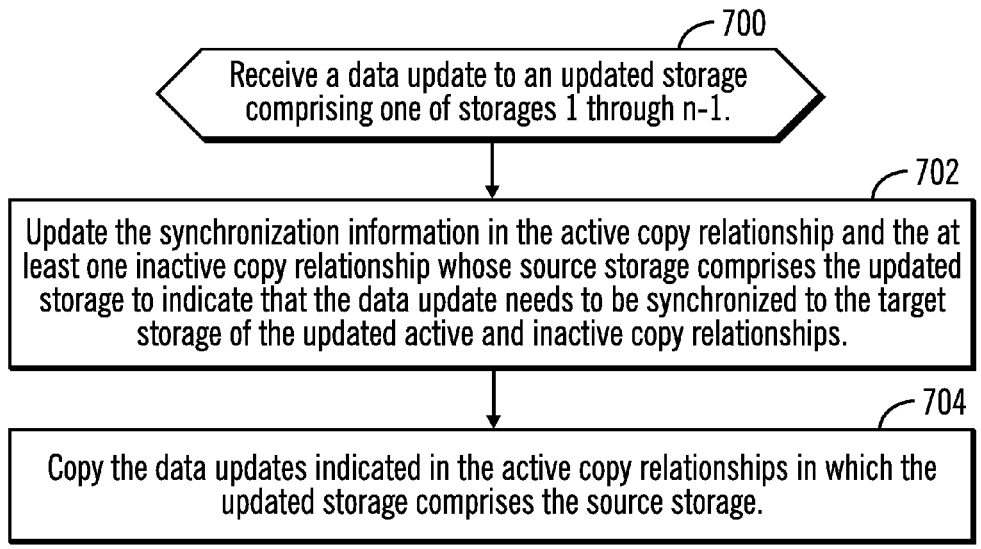
FIG. 7 illustrates an embodiment of operations to process an update to data at the source storage in an active copy relationship.

FIG. 7 illustrates an embodiment of operations by the I/O manager 116 and/or replication manager 114, $114_i$ to process an update to data an updated storage $104_i$ comprising one of the storages $104_1 \ldots 104_n$. The operations may be performed by the replication manager $114_i$ in the server $102_i$ including the storage $104_i$ that was updated, which may comprise a primary/production server or another server. Upon receiving (at block 700) the update to the data in the storage $104_n$, the synchronization information 408 for the active copy relationship $400_i$ and each of the inactive copy relationships $500_{i,j}$ whose source storage comprises the updated storage $104_i$ (at block 702) to indicate that the updated data needs to be synchronized to the target storage of the updated active $400_i$ and inactive $500_{i,j}$ copy relationships. The replication manager $114_i$ copies (at block 704) the update to the data in the source storage $104_i$ to the target storage $104_{i+1}$ indicated in the active copy relationship $400_i$. However, the inactive copy relationships do not cause the copying of the updated data to the target storages $104_j$ indicated in the inactive copy relationships $500_{i,j}$.

With the operations of FIG. 7, the synchronization information 508 in the inactive copy relationships $500_{i,j}$ are updated to indicate updated data in the storage $104_i$, so that when the inactive copy relationship $500_{i,j}$ is activated and used for resynchronization as part of a failback procedure, the updated data will be synchronized to or from the target storage of the activated inactive copy relationship to ensure proper resynchronization of the storage's data.

Figure 8:
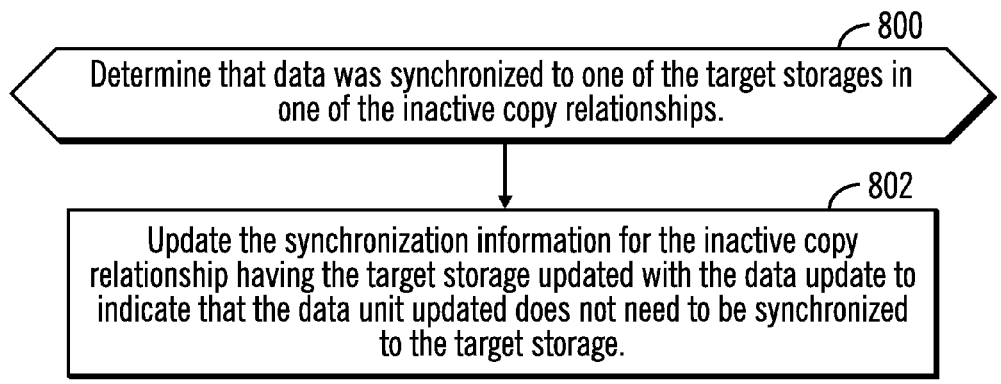
FIG. 8 illustrates an embodiment of operations to track synchronization for an inactive copy relationship.

FIG. 8 illustrates an embodiment of operations performed by a replication manager 114, $114_j$ managing one or more inactive copy relationship $500_{i,j}$, such as the replication manager $114_j$, to update the synchronization information 508 in the inactive copy relationships $500_{i,j}$ whose target storage $104j$ was updated with data from the source storage $104_{j-1}$ of an active copy relationship $400_{j-1}$. In one embodiment, the source server $102_{j-1}$ having the source storage $104_j$ may send a message when copying data to the target storage $104_{j-1}$ to other servers that have an inactive copy relationship $500_{i,j}$ including storage $104_j$ as the target storage. Upon determining (at block 800) that data was synchronized to one of the target storages $104_j$ in one of the inactive copy relationships $500_{i,j}$ from a source storage $104_{j-1}$ of an active copy relationship $400_{j-1}$, the replication manager $114_i$ managing the inactive copy relationship $500_{i,j}$ updates (at block 802) the synchronization information 508 for the inactive copy relationship $500_{i,j}$ whose target storage was updated to indicate that the data unit that was updated does not need to be synchronized to the target storage 506.

With the described embodiment of FIG. 8, inactive copy relationships $500_{i,j}$ are managed so that if the target $104_j$ is updated as a consequence of another active copy relationship $400_1 \ldots 400_{n-1}$, the synchronization information 508 in the inactive copy relationships $500_{i,j}$ are updated to indicate that source data does not need to be synchronized from the source storage $104_i$ to the already target $104j$.

Figure 9:
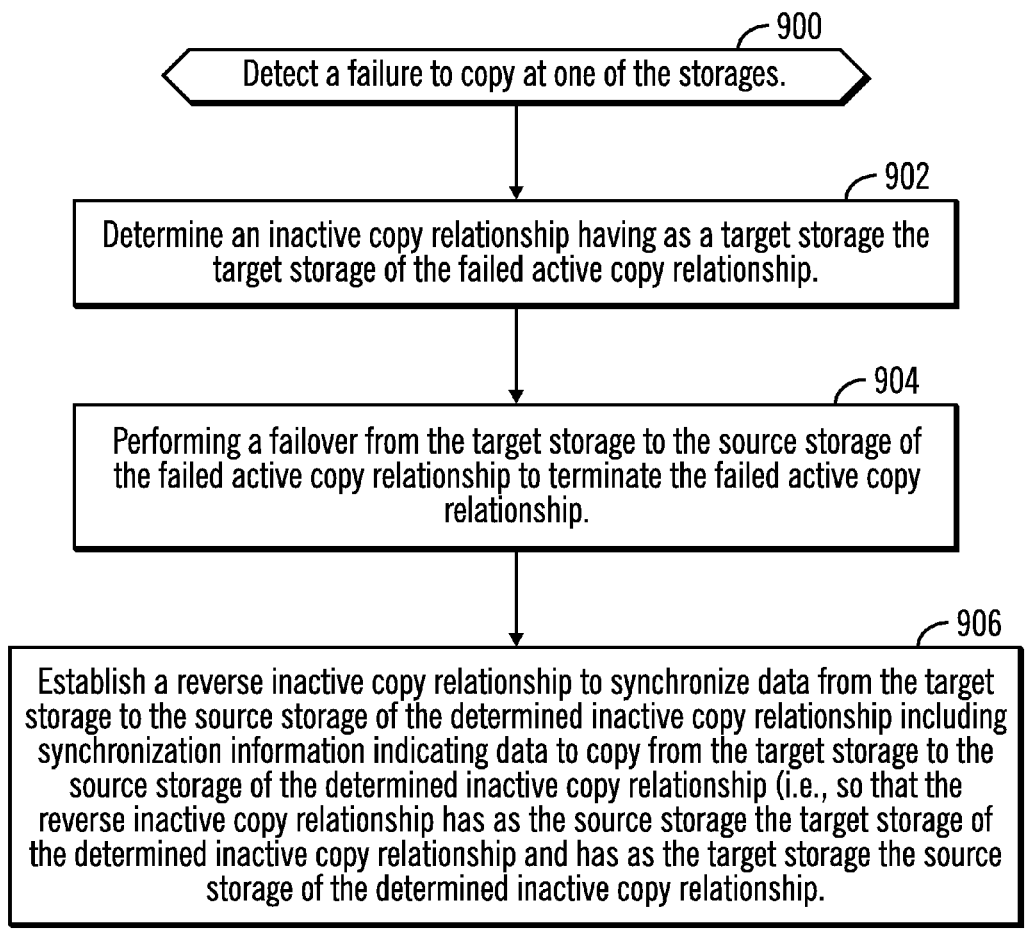
FIG. 9 illustrates an embodiment of operations to process a failure at one of the storages.

FIG. 9 illustrates an embodiment of operations by a failover/failback manager 110, $110_i$ to process the copy relationships when a failure at a storage $104_k$ is detected. The failure may result from a failure for a source storage $104i$ in an active copy relationship $400_k$ to copy to the target storage, which may occur if the target storage does not respond or responds with a failure. The failure may be at one of the storages in the active copy relationship $400_k$ and/or a failure in the network 106 connection between the servers having the source and target storages. Upon detecting (at block 900) the failure to copy for an active copy relationship $400_k$, a determination is made (at block 902) of an inactive copy relationship $500_{i,j}$ having as a target storage 506 the target storage $104_j$ of the failed active copy relationship $400_k$. A failover is performed (at block 904) from the target storage $104_j$ to which the failed source storage $104_k$ synchronized. This failover deactivates the failed active copy relationship $400_k$ having the failed storage $104_k$. A reverse inactive copy relationship $500_{j,i}$ is established (at block 906) to synchronize data from the target storage $104_j$ to the source storage $104_i$ of the determined inactive copy relationship $500_{i,j}$, including synchronization information 508 indicating data to copy from the target storage 104 to the source storage $104_k$ of the determined inactive copy relationship $500_{i,j}$. In this way, the reverse inactive copy relationship has as the source storage the target storage of the determined inactive copy relationship and has as the target storage the source storage of the determined inactive copy relationship.

After the failover operation of FIG. 9, there are now two inactive copy relationships $500_{i,j}$ and $500_{j,i}$ for the storage $104_j$ to which the failed source storage $104_k$ copied data. These two inactive copy relationships $500_{i,j}$ and $500_{j,i}$ track any changes that may happen to either storages $104_i$ and $104_j$ that may occur between the failover and the completion of the failback so that any inadvertent writes to the storage $104_j$ do not lead to data inconsistencies.

Figure 10:
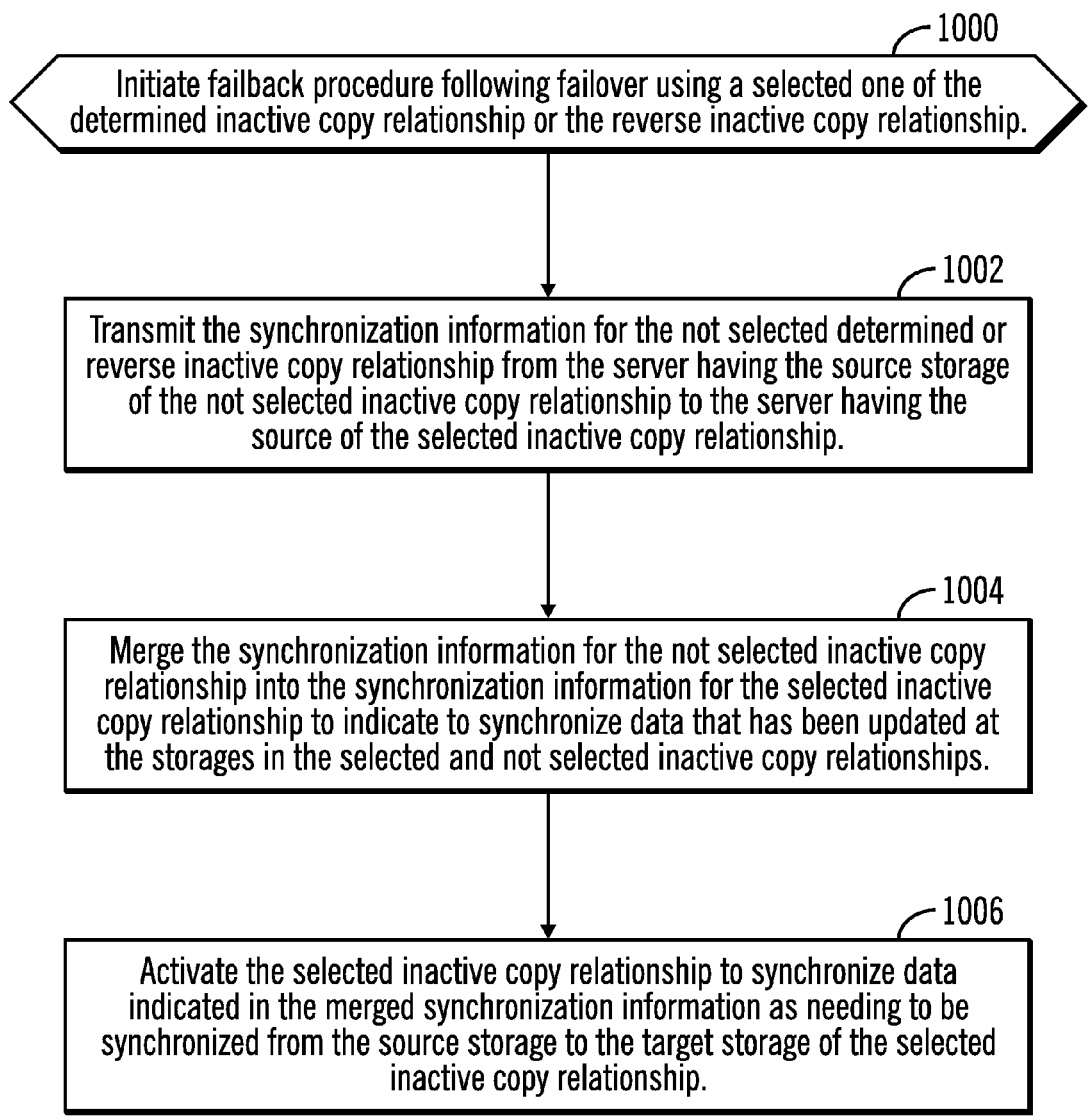
FIG. 10 illustrates an embodiment of operations to perform a failback.

FIG. 10 illustrates an embodiment of operations performed by the failover/failback manager 110, $110_i$ to perform failback for the failover described with respect to FIG. 9. The failback may be initiated upon user or program selection one of a determined inactive copy relationship $500_{i,j}$ having the target storage $104_j$ to which the failed storage $104_k$ was synchronized. Upon initiating (at block 1000) a failback procedure to the selected one of the determined inactive copy relationship $500_{i,j}$ or the reverse inactive copy relationship $500_{j,i}$, the failover/failback manager 110, $110_i$ transmits (at block 1002) the synchronization information 508 for the not selected determined $500_{i,j}$ or reverse $500_{j,i}$ inactive copy relationship from the server having the source storage of the not selected inactive copy relationship to the server having the source of the selected inactive copy relationship. The synchronization information for the not selected inactive copy relationship is merged (at block 1004) into the synchronization information for the selected inactive copy relationship to indicate to synchronize data that has been indicated as updated at the storages $104_i$ and $104_j$. In one embodiment, the merge comprises a logical OR operation on the bits for the data units in the synchronization information, e.g., bitmaps, of the determined and reverse inactive copy relationships. The selected inactive copy relationship is activated (at block 1006) to synchronize data indicated in the merged synchronization information as needing to be synchronized from the source storage to the target storage of the selected inactive copy relationship. After activating one of the determined or reverse inactive copy relationships, the other non-selected inactive copy relationship is terminated.

With the described embodiments, the synchronization information for the determined and reversed inactive copy relationships are merged, so that if the target of the selected inactive copy relationship is updated before the failback, its updated data will be overwritten when the source data of the selected inactive copy relationship is synchronized back to the target. This insures data integrity so that updates to the target of the selected inactive copy relationship not made to the source do not remain after synchronization, which if they did remain would result in the copies being out-of-synchronization.

Described embodiments provide techniques to use multiple inactive copy relationships to track changes so that if a resynchronization needs to be performed from one of the storages to another, an inactive copy relationship a target storage updated by a failed source storage may be selected to provide another source storage to use to synchronize that target storage. Further, a reverse inactive copy relationship may be created to use to track changes to the target storage after a failover and before failback is initiated to make sure that updates to the target storage are overwritten by source storage during resynchronization.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computational components of FIG. 1, including the hosts 100 and storage servers $102_1$, $102_2$ ... $102_n$ may be implemented in one or more computer systems, such as the computer system 1102 shown in FIG. 11. Computer system/server 1102 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1102 may be practiced in distributed cloud computing environments where tasks are performed by remote processing devices that are linked through a communications network. In a distributed cloud computing environment, program modules may be located in both local and remote computer system storage media including memory storage devices.

Figure 11:
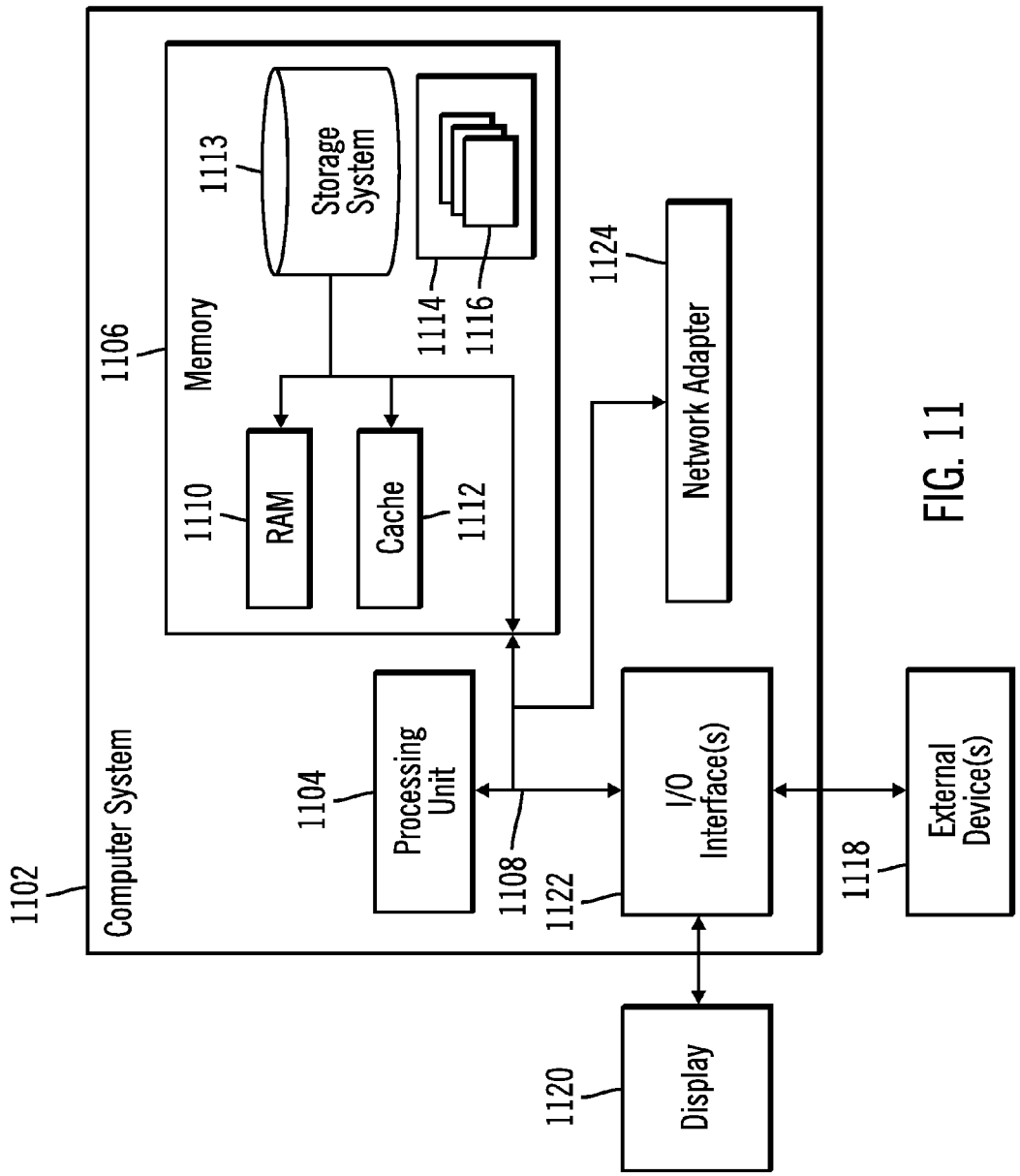
FIG. 11 illustrates a computing environment in which the components of FIG. 1 may be implemented.

As shown in FIG. 11, the computer system/server 1102 is shown in the form of a general-purpose computing device. The components of computer system/server 1102 may include, but are not limited to, one or more processors or processing units 1104, a system memory 1106, and a bus 1108 that couples various system components including system memory 1106 to processor 1104. Bus 1108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1102 typically includes a variety of computer system readable media. Such media may be any available media that is accessible by computer system/server 1102, and it includes both volatile and non-volatile media, removable and non-removable media.

System memory 1106 can include computer system readable media in the form of volatile memory, such as random access memory (RAM) 1110 and/or cache memory 1112. Computer system/server 1102 may further include other removable/non-removable, volatile/non-volatile computer system storage media. By way of example only, storage system 1113 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1108 by one or more data media interfaces. As will be further depicted and described below, memory 1106 may include at least one program product having a set (e.g., at least one) of program modules that are configured to carry out the functions of embodiments of the invention.

Program/utility 1114, having a set (at least one) of program modules 1116, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. The components of the computer 1102 may be implemented as program modules 1116 which generally carry out the functions and/or methodologies of embodiments of the invention as described herein. The systems of FIG. 1 may be implemented in one or more computer systems 1102, where if they are implemented in multiple computer systems 1102, then the computer systems may communicate over a network.

Computer system/server 1102 may also communicate with one or more external devices 1118 such as a keyboard, a pointing device, a display 1120, etc.; one or more devices that enable a user to interact with computer system/server 1102; and/or any devices (e.g., network card, modem, etc.) that enable computer system/server 1102 to communicate with one or more other computing devices. Such communication can occur via Input/Output (I/O) interfaces 1122. Still yet, computer system/server 1102 can communicate with one or more networks such as a local area network (LAN), a general wide area network (WAN), and/or a public network (e.g., the Internet) via network adapter 1124. As depicted, network adapter 1124 communicates with the other components of computer system/server 1102 via bus 1108. It should be understood that although not shown, other hardware and/or software components could be used in conjunction with computer system/server 1102. Examples, include, but are not limited to: microcode, device drivers, redundant processing units, external disk drive arrays, RAID systems, tape drives, and data archival storage systems, etc.

The reference characters used herein, such as i, j, k, and n, and any other variables, are used herein to denote a variable number of instances of an element, which may represent the same or different values, and may represent the same or different value when used with different or the same elements in different described instances.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method performed by a computer processor for copying data among n storages referenced as storages 1 through n, implemented in storage devices, wherein n is greater than or equal to three, comprising:
    establishing n−1 active copy relationships, wherein each active copy relationship copies data from one of the storages 1 through n−1 as a source storage to one other of the storages 2 through n as a target storage respectively, wherein each active copy relationship includes synchronization information indicating data to copy from the source storage to the target storage of the active copy relationship; and
    establishing at least one inactive copy relationship to copy data from one of the storages 1 through n−1 as the source storage to one other of the storages 2 through n as a target storage, such that the source and target storages in the at least one inactive copy relationship are not both also in a same of at least one of the active copy relationships, wherein each of the at least one inactive copy relationship includes synchronization information indicating data to copy from the source storage to the target storage of the at least one inactive copy relationship, wherein data is not synchronized from the source storage to the target storage of the at least one inactive copy relationship.

2. The method of claim 1, further comprising:
    receiving a data update to an updated storage comprising one of the storages 1 through n−1; and
    updating the synchronization information in the active copy relationship and the at least one inactive copy relationship whose source storage comprises the updated storage to indicate that the data update needs to be synchronized to the target storage of the active and inactive copy relationships having the updated synchronization information.

3. The method of claim 2, wherein the establishing the at least one inactive copy relationship comprises establishing for each storage i one inactive copy relationship for each target storage to which data from storage i is indirectly copied excluding the storage that is the target storage of the active copy relationship having the storage i as the source storage.

4. The method of claim 1, further comprising:
    in response to detecting a failure to copy at one of the storages comprising the source storage of a failed active copy relationship comprising one of the active copy relationships, activating a selected inactive copy relationship of the at least one inactive copy relationship having as a target storage the target storage of the failed active copy relationship to synchronize data from the source storage to the target storage of the selected inactive copy relationship.

5. The method of claim 1, further comprising:
    in response to a failure at one of the storages comprising the source storage of a failed active copy relationship comprising one of the active copy relationships, determining a determined inactive copy relationship of the at least one inactive copy relationship having as a target storage the target storage of the failed active copy relationship; and
    establishing a reverse inactive copy relationship to synchronize data from the target storage to the source storage of the determined inactive copy relationship including synchronization information indicating data to copy from the target storage to the source storage of the determined inactive copy relationship.

6. The method of claim 5, further comprising:
    receiving selection of a selected inactive copy relationship comprising one of the determined inactive copy relationship and the reverse inactive copy relationship;
    merging the synchronization information for the determined and reverse inactive copy relationships to indicate that data units updated at the source storages of the determined and reverse inactive copy relationships needs to be synchronized from the source storage to the target storage of the selected inactive copy relationship; and activating the selected inactive copy relationship to change a state of the selected inactive copy relationship to an activate copy relationship wherein updates to the source storage are copied to the target storage of the activated active copy relationship.

7. A system copying data among n storages referenced as storages 1 through n, wherein n is greater than or equal to three, comprising:

a processor; and a computer readable storage medium having program code that when executed by the processor performs operations, the operations comprising:

establishing n−1 active copy relationships, wherein each active copy relationship copies data from one of the storages 1 through n−1 as a source storage to one other of the storages 2 through n as a target storage respectively, wherein each active copy relationship includes synchronization information indicating data to copy from the source storage to the target storage of the active copy relationship; and establishing at least one inactive copy relationship to copy data from one of the storages 1 through n−1 as the source storage to one other of the storages 2 through n as a target storage, such that the source and target storages in the at least one inactive copy relationship are not both also in a same of at least one of the active copy relationships, wherein each of the at least one inactive copy relationship includes synchronization information indicating data to copy from the source storage to the target storage of the at least one inactive copy relationship, wherein data is not synchronized from the source storage to the target storage of the at least one inactive copy relationship.

8. The system of claim 7, wherein the operations further comprise:

receiving a data update to an updated storage comprising one of the storages 1 through n−1; and updating the synchronization information in the active copy relationship and the at least one inactive copy relationship whose source storage comprises the updated storage to indicate that the data update needs to be synchronized to the target storage of the active and inactive copy relationships having the updated synchronization information.

9. The system of claim 8, wherein the establishing the at least one inactive copy relationship comprises establishing for each storage i one inactive copy relationship for each target storage to which data from storage i is indirectly copied excluding the storage that is the target storage of the active copy relationship having the storage i as the source storage.

10. The system of claim 7, wherein the operations further comprise:

in response to detecting a failure to copy at one of the storages comprising the source storage of a failed active copy relationship comprising one of the active copy relationships, activating a selected inactive copy relationship of the at least one inactive copy relationship having as a target storage the target storage of the failed active copy relationship to synchronize data from the source storage to the target storage of the selected inactive copy relationship.

11. The system of claim 7, wherein the operations further comprise:

in response to a failure at one of the storages comprising the source storage of a failed active copy relationship comprising one of the active copy relationships, determining a determined inactive copy relationship of the at least one inactive copy relationship having as a target storage the target storage of the failed active copy relationship; and establishing a reverse inactive copy relationship to synchronize data from the target storage to the source storage of the determined inactive copy relationship including synchronization information indicating data to copy from the target storage to the source storage of the determined inactive copy relationship.

12. The system of claim 11, wherein the operations further comprise:

receiving selection of a selected inactive copy relationship comprising one of the determined inactive copy relationship and the reverse inactive copy relationship;

merging the synchronization information for the determined and reverse inactive copy relationships to indicate that data units updated at the source storages of the determined and reverse inactive copy relationships needs to be synchronized from the source storage to the target storage of the selected inactive copy relationship; and activating the selected inactive copy relationship to change a state of the selected inactive copy relationship to an activate copy relationship wherein updates to the source storage are copied to the target storage of the activated active copy relationship.

13. A computer program product for copying data among n storages referenced as storages 1 through n, wherein n is greater than or equal to three, wherein the computer program product comprises a computer readable storage medium having program instructions embodied therewith, the program instructions executable by a processor to cause operations, the operations comprising:

establishing n−1 active copy relationships, wherein each active copy relationship copies data from one of the storages 1 through n−1 as a source storage to one other of the storages 2 through n as a target storage respectively, wherein each active copy relationship includes synchronization information indicating data to copy from the source storage to the target storage of the active copy relationship; and establishing at least one inactive copy relationship to copy data from one of the storages 1 through n−1 as the source storage to one other of the storages 2 through n as a target storage, such that the source and target storages in the at least one inactive copy relationship are not both also in a same of at least one of the active copy relationships, wherein each of the at least one inactive copy relationship includes synchronization information indicating data to copy from the source storage to the target storage of the at least one inactive copy relationship, wherein data is not synchronized from the source storage to the target storage of the at least one inactive copy relationship.

14. The computer program product of claim 13, wherein the operations further comprise:

receiving a data update to an updated storage comprising one of the storages 1 through n−1; and updating the synchronization information in the active copy relationship and the at least one inactive copy relationship whose source storage comprises the updated storage to indicate that the data update needs to be synchronized to the target storage of the active and inactive copy relationships having the updated synchronization information.

15. The computer program product of claim 14, wherein the data update is copied from the updated storage to the target storage of the active copy relationship in which the updated storage comprises the source storage.

16. The computer program product of claim 14, wherein the operations further comprise:
determining that the data update was copied to a target storage in one of the at least one inactive copy relationship; and
updating the synchronization information for the at least one inactive copy relationship having the target storage updated with the data update to indicate that the data update does not need to be synchronized to the target storage.

17. The computer program product of claim 14, wherein the establishing the at least one inactive copy relationship comprises establishing for each storage i one inactive copy relationship for each target storage to which data from storage i is indirectly copied excluding the storage that is the target storage of the active copy relationship having the storage i as the source storage.

18. The computer program product of claim 17, wherein there are a maximum number of inactive copy relationships, wherein the operations further comprise:
limiting establishment of inactive copy relationships so as not to exceed the maximum number of inactive copy relationships.

19. The computer program product of claim 13, wherein the operations further comprise:
in response to detecting a failure to copy at one of the storages comprising the source storage of a failed active copy relationship comprising one of the active copy relationships, activating a selected inactive copy relationship of the at least one inactive copy relationship having as a target storage the target storage of the failed active copy relationship to synchronize data from the source storage to the target storage of the selected inactive copy relationship.

20. The computer program product of claim 13, wherein the operations further comprise:
in response to a failure at one of the storages comprising the source storage of a failed active copy relationship comprising one of the active copy relationships, determining a determined inactive copy relationship of the at least one inactive copy relationship having as a target storage the target storage of the failed active copy relationship; and
establishing a reverse inactive copy relationship to synchronize data from the target storage to the source storage of the determined inactive copy relationship including synchronization information indicating data to copy from the target storage to the source storage of the determined inactive copy relationship.

21. The computer program product of claim 20, wherein the operations further comprise:
performing a failover from the target storage to the source storage of the failed active copy relationship to terminate the failed active copy relationship.

22. The computer program product of claim 20, wherein the operations further comprise:
receiving selection of a selected inactive copy relationship comprising one of the determined inactive copy relationship and the reverse inactive copy relationship;
merging the synchronization information for the determined and reverse inactive copy relationships to indicate that data units updated at the source storages of the determined and reverse inactive copy relationships needs to be synchronized from the source storage to the target storage of the selected inactive copy relationship; and
activating the selected inactive copy relationship to change a state of the selected inactive copy relationship to an activate copy relationship wherein updates to the source storage are copied to the target storage of the activated active copy relationship.

23. The computer program product of claim 22, wherein the operations further comprise:
performing a failover from the target storage to the source storage of the failed active copy relationship to terminate the failed active copy relationship; and
initiating a failback operation from the target storage to the source storage of the selected inactive copy relationship, wherein the operations of merging the synchronization information and activating the selected inactive copy relationship are performed in response to initiating the failback operation.

24. The computer program product of claim 13, wherein the synchronization information for each of the active and inactive copy relationships includes a previous pointer addressing a previous bitmap structure for a previous interval and a current pointer addressing a current bitmap structure for a current interval following the previous interval for which writes are received, wherein the operations further comprise:
in response to completing copying of writes indicated in the previous bitmap structure addressed by the previous pointer from the source storage to the target storage of the inactive copy relationship, performing operations comprising:
setting the previous pointer to point to the current bitmap structure addressed by the current pointer to be the previous bitmap structure and setting the current pointer to address a new bitmap structure to be the current bitmap structure; and
indicating writes received to the source storage as needing to be synchronized in the current bitmap structure addressed by the set current pointer.

* * * * *